(12) United States Patent
Ahmad et al.

(10) Patent No.: US 11,803,928 B2
(45) Date of Patent: Oct. 31, 2023

(54) PROMOTING A TUTOR ON A PLATFORM

(71) Applicant: FILO EDTECH INC., Lewes, DE (US)

(72) Inventors: Imbesat Ahmad, Patna (IN); Shadman Anwer, Delhi (IN); Rohit Kumar, Hisar (IN)

(73) Assignee: FILO EDTECH INC., Lewes, DE (US)

( * ) Notice: Subject to any disclaimer, the term of this patent is extended or adjusted under 35 U.S.C. 154(b) by 9 days.

(21) Appl. No.: 17/738,824

(22) Filed: May 6, 2022

(65) Prior Publication Data

US 2022/0261939 A1    Aug. 18, 2022

(51) Int. Cl.
*G06Q 50/20* (2012.01)
*G06Q 10/0639* (2023.01)

(52) U.S. Cl.
CPC ..... *G06Q 50/205* (2013.01); *G06Q 10/06398* (2013.01); *G06Q 50/20* (2013.01)

(58) Field of Classification Search
USPC ...................................................... 705/326
See application file for complete search history.

(56) References Cited

U.S. PATENT DOCUMENTS

| | | | | |
|---|---|---|---|---|
| 6,789,047 B1 * | 9/2004 | Woodson | ......... | G06Q 10/06398 434/350 |
| 2009/0327053 A1 * | 12/2009 | Niblock | ................. | G06Q 50/20 434/118 |
| 2011/0053133 A1 * | 3/2011 | Rock | ........................ | G09B 5/00 434/351 |
| 2018/0301048 A1 * | 10/2018 | Almassizadeh | ....... | G06F 16/954 |
| 2018/0308376 A1 * | 10/2018 | Aslan | ..................... | G09B 19/00 |

(Continued)

FOREIGN PATENT DOCUMENTS

| CN | 108596523 A | * | 9/2018 |
| CN | 112348408 A | * | 2/2021 |
| CN | 113569112 A | * | 10/2021 |

OTHER PUBLICATIONS

Kenyon, Bobbi Jo "Teachers' Formative Assessment Use to Check for Understanding and to Adjust Instruction", Walden University, 2019, https://scholarworks.waldenu.edu/cgi/viewcontent.cgi?article=7622&context=dissertations (Year: 2019).*

*Primary Examiner* — Lynda Jasmin
*Assistant Examiner* — Rebecca R Novak
(74) *Attorney, Agent, or Firm* — Shumaker, Loop & Kendrick, LLP

(57) ABSTRACT

A system and a method for promoting a tutor on a platform. The system receives a tutor profile from the tutor. The tutor profile comprises a set of information about the tutor and a first cohort of students assigned to the tutor. The system randomly assigns a question received from a student belonging to a second cohort of students to the tutor in real time. The system further receives an answer to the question from the tutor. Further, the system analyses the answer based on a machine learning model. Subsequently, the system requests feedback about the tutor from the student of the second cohort of students. The system evaluates the tutor based on the plurality of parameters and the feedback receiving using deep learning algorithms. Finally, the system promotes the tutor for a group coaching of the students on the platform.

16 Claims, 5 Drawing Sheets

(56) References Cited

U.S. PATENT DOCUMENTS

2019/0244127 A1\* 8/2019 Amado .................... G09B 5/06
2020/0126438 A1\* 4/2020 Shehata ................... G06N 5/02
2020/0302296 A1\* 9/2020 Miller .................... G06N 20/20
2021/0294821 A1\* 9/2021 Gostelow .............. G06F 16/248

\* cited by examiner

PROMOTING A TUTOR ON A PLATFORM

PRIORITY INFORMATION

The present application claims priority from Indian patent application no 202221006193 filed on 4 Feb. 2022.

TECHNICAL FIELD

The present subject matter described herein, in general, relates to a system and a method for promoting a tutor.

BACKGROUND

Educational system and related practices are fundamental basis of any society. Generally, learning in schools and colleges in a traditional manner has been seen as one way process with a learning person at the receiving end. Conventional approach towards education has a limited options for any learner. However, in an era of customization in a digital world, everything is being looked at for a change. Therefore, the conventional approach of education is looked upon to shift to an openly accessible, unbiased, and suitable experience. An ideal educational system should keep a balance between a learning member, an educating member, and a justifiable curriculum of study. Role of a teacher, an educator, and a mentor in development of a learner, and a student has been well known and documented to be crucial. Therefore, equal attention should be given to both ends of the educational system.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for promoting a tutor on a platform in real time. This summary is not intended to identify essential features of the claimed subject matter nor is it intended for use in determining or limiting the scope of the claimed subject matter.

In one implementation, a method for promoting a tutor on a platform in real time is disclosed. Initially, a tutor profile may be received from a tutor on a platform. The tutor profile may comprise a set of information about the tutor, and a first cohort of students assigned to the tutor. The set of information may comprise a demographic information, an academic detail, a subject of interest, a topic of interest, a language preference, a preferred mode of communication, an introductory video, and a time preference from the tutor. Further, a question may be randomly assigned to the tutor in real time, wherein the question is received from a student belonging to a second cohort of students. The question may be related to the subject of interest and the topic of interest of the tutor. Furthermore, an answer to the question may be received from the tutor. The answer may be received in at least a textual form, an audio form, and an audio-visual form. Subsequently, the answer may be analysed based on a machine learning model. The answer may be analysed based on a plurality of parameters comprising an accuracy of the answer, a type of the answer, a time taken by the tutor to answer, a number of questions assigned to a number of questions answered ratio, and a language used in the answer by the tutor. Further, a feedback about the tutor may be requested from a student of the second cohort of students. The feedback may be based on the plurality of parameters related to the answers received from the tutor. Furthermore, the tutor may be evaluated based on the plurality of parameters and the feedback received using deep learning algorithms. The tutor may be evaluated by comparing the feedback with an average feedback received by an expert tutor, and comparing the time taken by the tutor to answer with an average time taken by the expert tutor to answer the question. It may be understood that the expert tutor is assigned to the second cohort of students. Finally, the tutor on the platform may be promoted for a group coaching of the students based on the evaluation and the feedback received from the student belonging to the second cohort of students. The group coaching may comprise the first cohort of students and the second cohort of students. In one aspect, the aforementioned method for promoting a tutor on a platform in real time may be performed by a processor using programmed instructions stored in a memory.

In another implementation, a non-transitory computer readable medium embodying a program executable in a computing device for promoting a tutor on a platform in real time is disclosed. The program may comprise a program code for receiving a tutor profile from a tutor on a platform. The tutor profile may comprise a set of information about the tutor, and a first cohort of students assigned to the tutor. The set of information may comprise a demographic information, an academic detail, a subject of interest, a topic of interest, a language preference, a preferred mode of communication, an introductory video, and a time preference from the tutor. Further, the program may comprise a program code for randomly assigning a question to the tutor in real time, wherein the question is received from a student belonging to a second cohort of students. The question may be related to the subject of interest and the topic of interest of the tutor. Furthermore, the program may comprise a program code for receiving an answer to the question from the tutor. The answer may be received in at least a textual form, an audio form, and an audio-visual form. Subsequently, the program may comprise a program code for analysing the answer based on a machine learning model. The answer may be analysed based on a plurality of parameters comprising an accuracy of the answer, a type of the answer, a time taken by the tutor to answer, a number of questions assigned to a number of questions answered ratio, and a language used in the answer by the tutor. Further, the program may comprise a program code for requesting a feedback about the tutor from a student of the second cohort of students. The feedback may be based on the plurality of parameters related to the answers received from the tutor. Furthermore, the program may comprise a program code for evaluating the tutor based on the plurality of parameters and the feedback received using deep learning algorithms. The tutor may be evaluated by comparing the feedback with an average feedback received by an expert tutor, and comparing the time taken by the tutor to answer with an average time taken by the expert tutor to answer the question. It may be understood that the expert tutor is assigned to the second cohort of students. Finally, the program may comprise a program code for promoting the tutor on the platform for a group coaching of the students based on the evaluation and the feedback received from the student belonging to the second cohort of the students. The group coaching may comprise the first cohort of students and the second cohort of students.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for promoting a tutor on a platform in real time disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
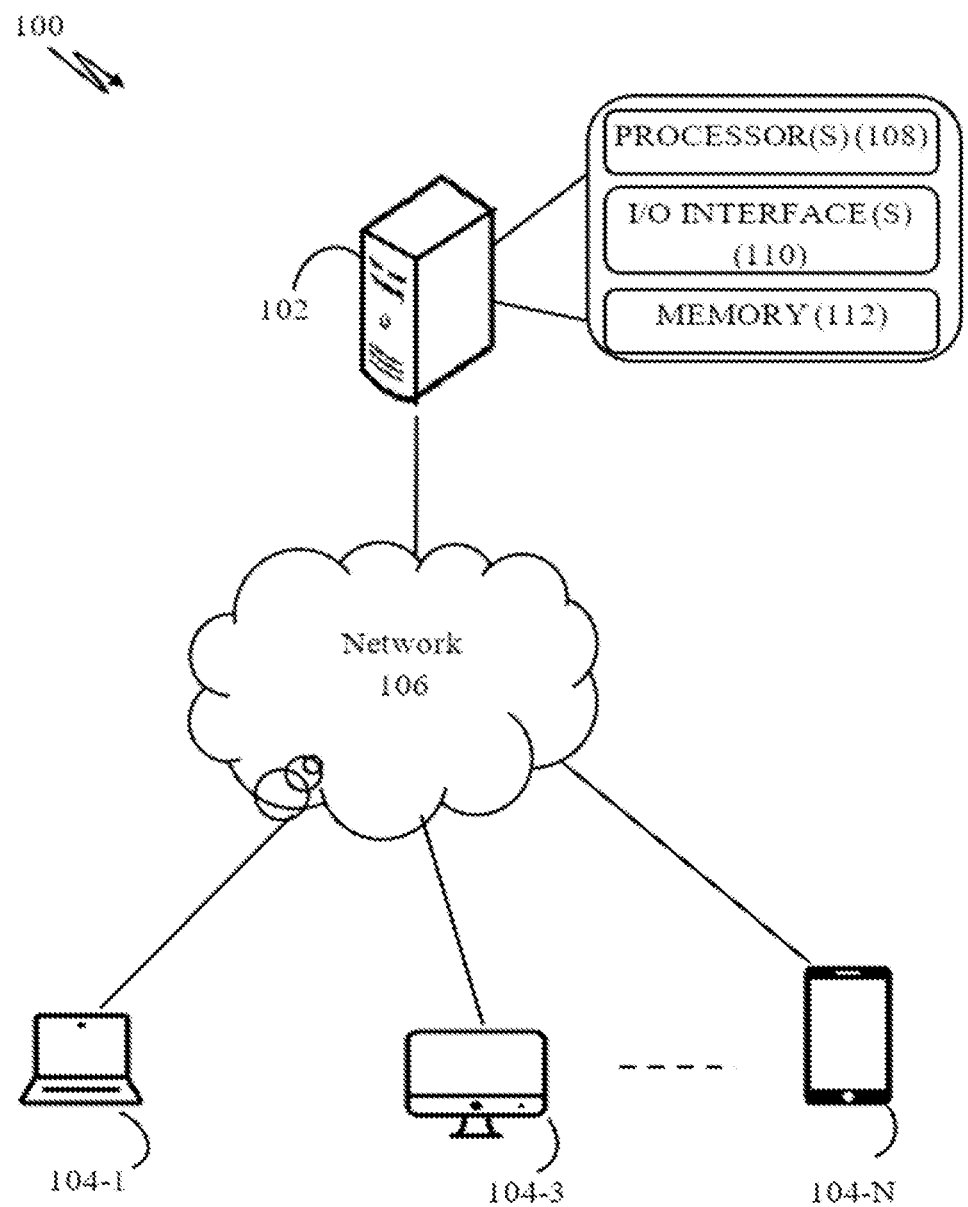
FIG. 1 illustrates a network implementation promoting a tutor on a platform in real time, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "generating," "evaluating," "assigning," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for promoting a tutor on a platform in real time. The promotion of tutor indicates change in a category of the tutor from an initial level to a medium level to a top level of experience. The goal of the invention is to properly evaluate the tutor teaching on an educational platform (hereafter a platform). The evaluation is aimed to be completely automated, unbiased, performance oriented and reasonable. The system initially receives a tutor profile from a tutor on a platform. The tutor profile includes a set of information about the tutor as well as a first cohort of students assigned to the tutor. It may be understood that the tutor teaches the students belonging to the first cohort of students, as it is the cohort assigned to the tutor specifically. Further, the system randomly assigns a question to the tutor in real time, wherein the question is received from a student belonging to a second cohort of students. Furthermore, the system receives an answer to the question from the tutor.

Upon receiving the answer, the system analyses the answer based on a machine learning model. Subsequently, the system requests a feedback about the tutor from the student of the second cohort of students. The system further evaluates the tutor based on the plurality of parameters and the feedback receiving using deep learning algorithms. Finally, the system promotes the tutor for a group coaching of the students on the platform. It may be understood that the group coaching includes the students in the first cohort of students and the students in the second cohort od students.

In an embodiment, the system promotes a tutor on a platform in real time. It may be noted that the tutor is a part of the platform and teaches a first cohort of students on the platform. In another embodiment, there may be one or more tutors already promoted as an expert tutor on the platform and assigned to a second cohort of students. The current invention helps to identify when the tutor has achieved the expertise and qualifies to become the expert tutor.

Certain technical challenges exist for achieving the goal of promoting a tutor on a platform in real time. One technical challenge includes automatically analysing an answer provided by the tutor in real time. The solution presented by the embodiments disclosed herein to address the above challenge is a machine learning model for Natural Language Processing (NLP) techniques. It may be noted that use of one or more machine learning models is required to analyse the answer received from the tutor. The machine learning model may analyse the answer based on a plurality of parameters comprising an accuracy of the answer, a type of the answer, a time taken by the tutor to answer, a number of questions assigned to a number of questions answered ratio, and a language used in the answer by the tutor. Another technical challenge includes, evaluating the tutor purely on a basis of performance and feedback of students in an unbiased manner.

The solution presented by the embodiments disclosed herein to address the above challenge is analysing the tutor using deep learning algorithms. The deep learning algorithms analyse the tutor based on the plurality of parameters and the feedback received from the students receiving the answer. Further, the tutor is evaluated by comparing the feedback with an average feedback received by an expert tutor, and comparing the time taken by the tutor to answer with an average time taken by the expert tutor to answer the question. Another technical challenge includes, promoting the tutor on the platform in real time on basis of the evaluation. The solution presented by the embodiments disclosed herein to address this challenge is promoting the tutor for a group coaching of the students based on the evaluation and the feedback received from the student belonging to the second cohort of the students, wherein the group coaching comprises the first cohort of students and the second cohort of students.

Referring now to FIG. 1, a network implementation 100 of a system 102 for promoting a tutor on a platform in real time is disclosed. Initially, the system 102 receives a tutor profile from a tutor on a platform. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives information from the tutor from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types.

The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for promoting a tutor on a platform in real time. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for promoting a tutor on a platform in real time. The system 102 receives a tutor profile from the tutor. The tutor profile may comprise a set of information about the tutor and a first cohort of students assigned to the tutor. The set of information may comprise a demographic information, an academic detail, a subject of interest, a topic of interest, a language preference, a preferred mode of communication, an introductory video, and a time preference from the tutor. The demographic information may comprise a complete name, an address, and a location of the tutor.

The academic detail may comprise qualification details of the tutor for a graduation, a post-graduation and a diploma as may be completed by the tutor. The subject of interest may be Physics, Biology, Mathematics, Chemistry, and the like. The topic of interest may be mechanical physics, human anatomy, trigonometry, inorganic chemistry and the like.

The language preference may be a communication language selected by the tutor to communicate on the platform. For instance, the tutor may be familiar with English, German and French languages. However, the tutor may be most comfortable teaching in English, so English may be considered the language of preference or the preferred language by the tutor.

The preferred mode of communication may be through an email, an audio, and a video mode. The introductory video may be understood as a short 1-to-2-minute video of the tutor describing about the tutor's personality and a reason for being on the platform briefly. The time preference may allow the tutor to select and suggest most preferred time for coaching and teaching the students on the platform.

In one embodiment, the system 102 may receive the set of information in a structured data format. It is to be noted that the system 102 may perform data computations on the structured data format. In one aspect, the system 102 may receive the information in an unstructured data format. Subsequently, the system 102 may perform data cleaning on the unstructured data format to obtain the structured data format. It must be noted that the system 102 may utilize predefined data cleaning algorithms to clean the unstructured data.

Further to receiving the tutor profile, the system 102 may randomly assign a question to the tutor in real time, wherein the question is received from a student belonging to a second cohort of students. The question may be related to the subject of interest of the tutor. In one example, the question may be about predicting a probability. Therefore, the question may be assigned to the tutor submitting mathematics as the subject of interest. In another example, the question may be about human anatomy. Therefore, the question may be assigned to the tutor submitting biology as the subject of interest.

Further to randomly assigning the question, the system 102 may receive an answer from the tutor. The answer may be received in at least a textual form, an audio form, and an audio-visual form. Further, the system 102 may convert the answer in an audio form, and an audio-visual form to the textual form using an audio recognition technique. In one example, the tutor may provide the answer in the form of a voice note. In another example, the tutor may shoot a video while the answer.

Further to receiving the answer, the system 102 may analyse the answer based on a machine learning model. The answer may be analysed based on a plurality of parameters comprising an accuracy of the answer, a type of the answer, a time taken by the tutor to answer, a number of questions assigned to a number of questions answered ratio, and a language used in the answer by the tutor. As an example and not by way of limitation, the machine learning model may be based on a support vector machine (SVM). As another example and not by way of limitation, the machine learning model may be based on a regression model. As another example and not by way of limitation, the machine learning model may be based on a deep convolutional neural network (DCNN).

In one example, the machine learning model may be a continually learning model. Initially, the system 102 may store data relating to the questions asked by the students and the answers given by the tutor in real time. Further, a training data set may be created containing all sorts of questions possible around all subjects on the platform. The questions may also be accompanied with the answers. Therefore, once a new question may be asked by the student, the new question and the answer given by the tutor may also get stored and analysed by the system 102. In other words, the machine learning model may be fed with the answers given by the tutor on the platform. It may also be understood that the machine learning model may analyse its accuracy in real time and keep learning during operation. Therefore, the accuracy, the efficiency of the machine learning model may only grow during operation.

In one example, the system 102 may calculate the time taken by the tutor to answer the question, wherein a timer may be activated by the system 102. The timer may be activated when the question is displayed on the screen of the tutor and the timer may be stopped when the answer is received from the tutor. In one example, a maximum limit of 90 seconds may be set on the timer and the tutor may be required to answer within the time limit. In another example, the tutor may read the question, think about the answer and enter the answer in the system 102 within 35 seconds. Therefore, the system 102 may calculate 35 seconds as the time taken to answer the question, by the tutor.

In one example, the accuracy of the answer may be derived by comparing the tutor's answer with a prestored answer present in a knowledge database of the system 102. In one example, the accuracy level of the answer may be measured in percentage from 0 to 100. It is to be noted that 0% accuracy may indicate a highly inaccurate answer, 50% accuracy may indicate a half accurate answer and 100% accuracy may indicate a completely accurate answer. In other example, the type of the answer may be a short answer, and a long answer where the short answer may be given in a few words and the long answer may be given in multiple sentences.

In other example, the time taken by the tutor to answer the question may be analysed. It may be understood that the time taken to answer also indicates knowledge, preparedness, experience of the tutor in answering similar question in past. For instance, lesser the time taken to answer more is the experience and knowledge of the tutor.

Further, the system 102 may calculate a number of questions assigned to a number of questions answered ratio for the tutor. Further, the ratio may indicate an efficiency of the tutor. In one example, the number of questions assigned to the tutor may be 10, and the number of questions answered may be 10, thus the ratio may be 10/10 i.e. 1:1. Further, the language used by the tutor to answer the question may also be analysed by the system 102.

Subsequent to analysing the answer, the system 102 may request a feedback about the tutor from the student of the second cohort of students. The feedback may be based on the plurality of parameters related to the answers received from the tutor. In one example, the system 102 may send a feedback form to the student immediately after sharing the answer to the question with the student.

Further, the feedback form may comprise a list of ratings for the plurality of parameters of the tutor. In one example, the student may fill in the feedback form and also select the tutor as a 'favourite tutor'. It may be understood that more positive feedback the tutor may receive, more will be the progress of the tutor on the platform. The feedback may also be shared on the tutor profile on the platform.

Further to requesting the feedback, the system 102 may evaluate the tutor based on the plurality of parameters and the feedback received using deep learning algorithms. Examples of the deep learning algorithms include Convolutional Neural Networks (CNN), Recurrent Neural Networks (RNN), and Artificial Neural Networks (ANN). The tutor may be evaluated by comparing the feedback with an average feedback received by an expert tutor, and comparing the time taken by the tutor to answer with an average time taken by the expert tutor to answer the question. The expert tutor may be assigned to the second cohort of students. In one example, the system may compare the feedback received by the tutor to the average feedback received by the expert tutor. It may be understood that the expert tutor may be the highest category of tutor teaching on the platform with utmost expertise. Initially the tutor newly joining the platform may be categorized as a new tutor or a novice tutor.

Further, the novice tutor may be assigned common questions by the system 102 relating only to the subject of interest and teaching only the students in the first cohort of students. Furthermore, with time the novice tutor may answer more and more questions accurately with positive feedback from the students. Therefore, the system 102 may start assigning questions similar to the subject of interest received by students of the second cohort of students to the novice tutor. Further, a consistence performance from the tutor may lead to increase in number of questions, and number of cohorts assigned to the tutor. The performance of the tutor may be monitored using a performance report generated by the system 102 in following steps.

In one example, the tutor may be categorized as a novice tutor, an experienced tutor and an expert tutor. The novice tutor may be understood as a fresh tutor, and a fresh graduate joining the platform for a first time to teach. The novice tutor may be a good fit for a one-to-one teaching, with one student of a cohort at a time. Further, any tutor with an illustrated experience of teaching multiple students at one time may be considered as an experienced tutor. Finally, a tutor with expertise in the subject of interest and similar subjects, may be assigned to more than one cohort of the students for group coaching and is regarded as an expert tutor.

Further to evaluating the tutor, the system 102 may promote the tutor on the platform for a group coaching of the students based on the evaluation and the feedback received from the student belonging to the second cohort of students. the group coaching may comprise the first cohort of students and the second cohort of students. In one example, the tutor may be teaching only 1 student at the time of joining the platform.

Further, the tutor may perform well and the system 102 may promote the tutor to teach 4 students. Furthermore, the tutor may keep performing good and get promoted to teach 50 students and the 50 students may be assigned in more than one cohort of students on the platform.

Further the system 102 may categorize the tutor as a novice tutor, an experienced tutor, and an expert tutor based upon the feedback received from one or more student from one or more cohort. It may be understood that the tutor may be considered as the novice tutor if he has joined the platform newly with not much experience in teaching and assigned to only one cohort of students.

Further, the experienced tutor may indicate a medium category of the tutor with considerable experience on the platform and teaching to a few cohort of students. Furthermore, the expert tutor may be understood to be top-most category of the tutor. The expert tutor may be assigned to multiple cohorts of students and for multiple subjects. The subjects assigned to the expert tutor may be different but related to the subject of interest mentioned by the tutor while entering the platform.

Further the system 102 may generate a performance report of the tutor over a time period on the platform. The performance report may be generated using the deep learning algorithms, and the performance report may be based upon an efficiency of the tutor, a teaching approach, a response time of the tutor, a consistency of rating, an availability, an answering ability, and a result achieved by the students in the cohort allocated to the tutor. It may be understood that one deep learning algorithm may be applied for one parameter. Therefore, separate deep learning algorithms may be developed for each of the following point: the efficiency of the tutor, the teaching approach, the response time of the tutor, the consistency of rating, the availability, the answering ability, and the result achieved by the students in the cohort allocated to the tutor. It may be noted that the deep learning algorithms include the CNN, the RNN, and the ANN.

In one example, the performance report of the tutor may be generated on a weekly basis. In other example, the performance report of the tutor may be generated on a monthly basis. The performance report may provide an unbiased means to understand the teaching calibre of the tutor in a reasonable manner.

Further, the system 102 may change the cohort of the tutor depending on the feedback and a performance of one or more student in the cohort. In one example, the tutor with a good performance report may be kept in the same category or promoted to a higher category. In another example, the tutor with a weak performance report may be shifted to a lower category of tutor and given lesser students to teach. Further, the system 102 may dynamically change the category of the tutor on basis of an analysis of the tutor in real time. The analysis may be based upon the performance report of the tutor.

Consider an example, where two tutors named Joy and Sara enroll as tutor on the platform. Joy is a Microbiology postgraduate, and his subject of interest may be biology. On the other hand, Sara is a Chemistry graduate, and her subject of interest may be organic chemistry. Initially, the system 102 may receive a tutor profile from Joy and Sara on the platform. Further, Joy may be assigned to a first cohort of students and Sara may be assigned to a second cohort of students. Further, the system 102 may receive a set of information about each of the tutor and the first cohort of students and the second cohort of students respectively. Further, the system 102 may randomly assign a question to Joy received from a third cohort of students and a question to Sara received from a fourth cohort of students. Joy and Sara may both answer questions in their own frame of time. Further, Joy may provide an answer in a textual form. Sara may provide an answer in an audio form. The system 102 may convert the answer given by Sara to the textual form using the audio recognition technique.

Further, the system 102 may analyse the answers provided by Joy and Sara using a machine learning model using a plurality of parameters such as time, accuracy, language, type of answer. Joy may have answered the question in 90 seconds, while Sara may have answered the question in 10 minutes. Further, the system may request a feedback about Joy from the student of the third cohort of students, and a feedback about Sara from the student of the fourth cohort of students. Joy may receive a positive feedback, and Sara may receive a negative feedback. Further, the system 102 may evaluate Joy on the basis of the plurality of parameters and the positive feedback. Similarly, the system 102 may evaluate Sara on the basis of the plurality of parameters and the negative feedback. Further, the system 102 may promote Joy from a novice tutor to an experience tutor. Further, Joy may do group coaching for the first cohort of students and the third cohort of students. On other hand, Sara may be continued to be categorized as a novice tutor and continue to teach only the students of the second cohort of the students.

It may be understood from the above paragraphs of description and the examples, that the present invention is time effective, memory friendly, and unconventional solution for the platform. A traditional coaching and teaching methods powered with manual efforts may require infinite time and efforts from multiple individuals. Unlike the system 102, the traditional coaching method may often prove to be inefficient, non-responsive, and biased in nature due to human-to-human influences.

Further, monitoring progress of each of the tutor in real time, using artificial intelligence and deep learning algorithms is impossible in the traditional coaching methods. Furthermore, analysing the answer provided by the tutor based on the plurality of parameters may also be manually impossible. Another aspect missing in the traditional coaching methods may be the evaluation of the tutor and the performance-based promotion and the demotion of the tutor.

In the present invention, the machine learning model and the deep learning algorithms may work in real time during the operation. Further, the machine learning model may be continuously learning in nature. Lastly, the random assigning of the question by the system 102 to the tutor may be clearly understood to be impossible for the individuals in the traditional coaching methods.

It may be understood that the present invention uses fully automated system 102 with no human involvement in operations. Therefore, efficiency and accuracy of the machine learning model may be bound to increase manifold as compared to the undeniable limitations of the traditional coaching methods. In view of the above, the present invention may be understood to be an advancement over the human intelligence and thus the steps may not be performed by the individuals in the traditional coaching methods.

Figure 2:
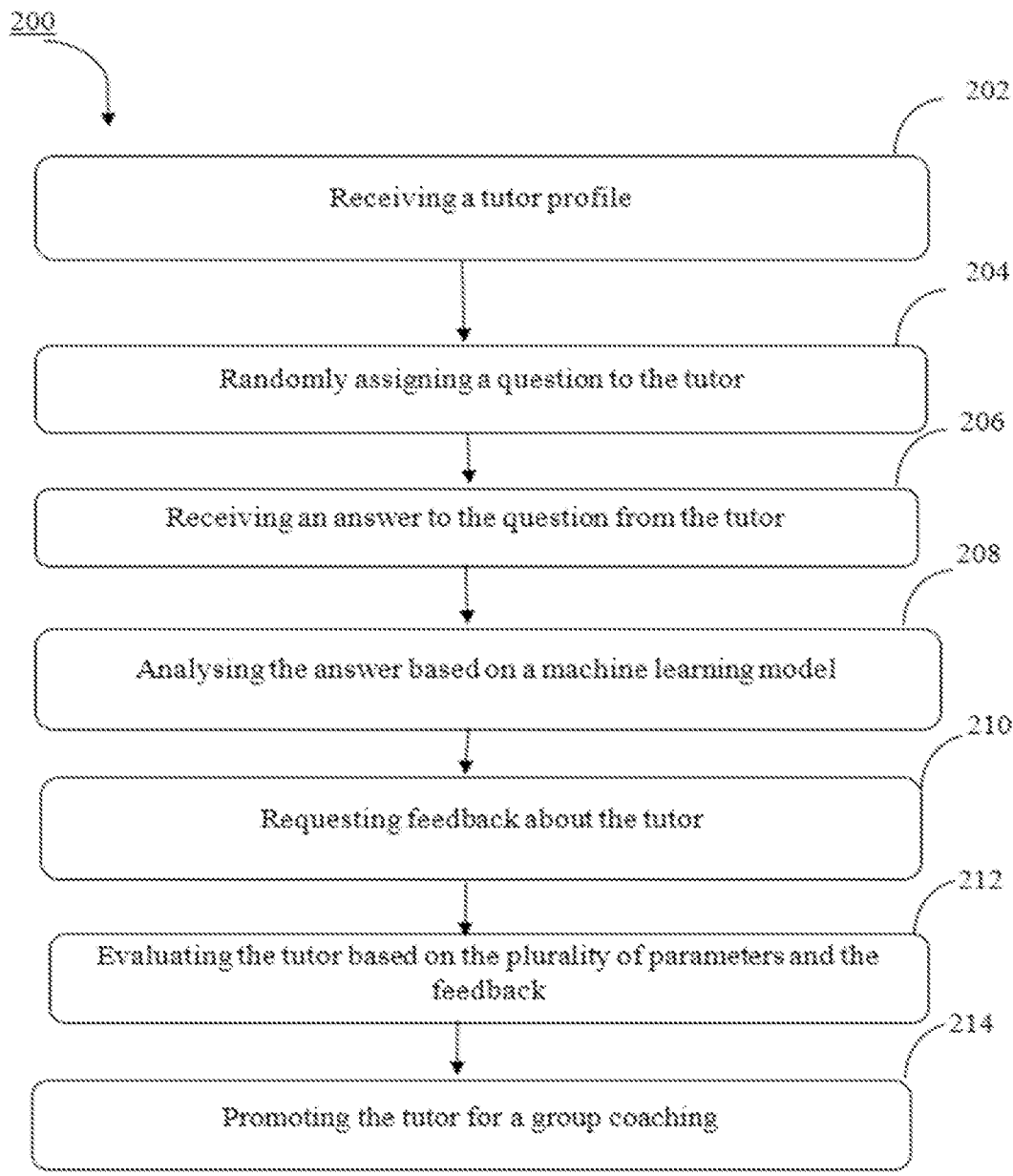
FIG. 2 illustrates a method promoting a tutor on a platform in real time, in accordance with an embodiment of the present subject matter.

Referring now to FIG. 2, a method 200 for promoting a tutor on a platform in real time is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for promoting a tutor on a platform in real time. Additionally, individual blocks may be deleted from the method 200 without departing from the scope of the subject matter described herein. Furthermore, the method 200 for promoting a tutor on a platform in real time can be implemented in any suitable hardware, software, firmware, or combination thereof. However, for ease of explanation, in the embodiments described below, the method 200 may be considered to be implemented in the above-described system 102.

At block 202, a tutor profile may be received from a tutor on a platform. The tutor profile may comprise a set of information about the tutor, and a first cohort of students assigned to the tutor. The set of information may comprise a demographic information, an academic detail, a subject of interest, a topic of interest, a language preference, a preferred mode of communication, an introductory video, and a time preference from the tutor.

At block 204, a question may be randomly assigned to the tutor in real time, wherein the question is received from a student belonging to a second cohort of students. The question may be related to the subject of interest and the topic of interest of the tutor.

At block 206, an answer to the question may be received from the tutor. The answer may be received in at least a textual form, an audio form, and an audio-visual form.

At block 208, the answer may be analysed based on a machine learning model. The answer may be analysed based on a plurality of parameters comprising an accuracy of the answer, a type of the answer, a time taken by the tutor to answer, a number of questions assigned to a number of questions answered ratio, and a language used in the answer by the tutor.

At block 210, a feedback may be requested about the tutor from the student of the second cohort of students. The feedback may be based on the plurality of parameters related to the answers received from the tutor.

At block 212, the tutor may be evaluated based on the plurality of parameters and the feedback received using deep learning algorithms. The tutor may be evaluated by comparing the feedback with an average feedback received by an expert tutor, and comparing the time taken by the tutor to answer with an average time taken by the expert tutor to answer the question. It may be understood that the expert tutor is assigned to the second cohort of students.

At block 214, the tutor may be promoted for a group coaching of the students on the platform based on the evaluation and the feedback received from the student belonging to the second cohort of the students. The group coaching may comprise the first cohort of students and the second cohort of students.

Figure 3:
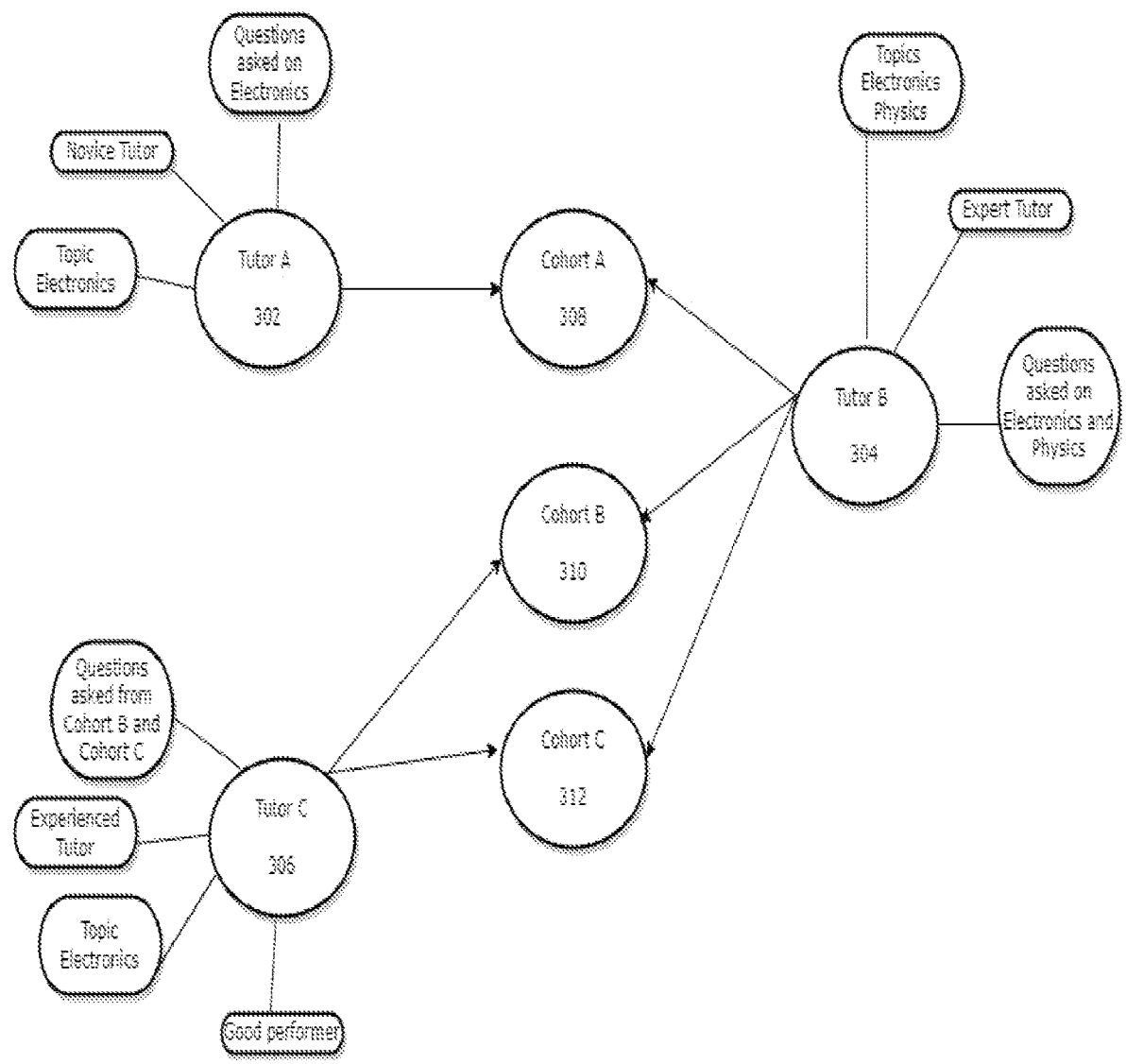
FIG. 3 illustrates an exemplary embodiment of the present invention for promoting a tutor on a platform.

FIG. 3 illustrates an exemplary embodiment 300 of the present invention for promoting a tutor B 306. The FIG. 3 shows three tutors, namely a tutor A, the tutor B, and a tutor C teaching on a platform. The platform may have three cohorts of students, namely a cohort A, a cohort B, and a cohort C. Further, the tutor A may be a novice tutor newly joining the platform. Therefore, the tutor A may be asked questions only from the topic of interest as provided by the tutor A. The tutor A may be sent questions asked from the cohort A students. It may be understood that the tutor A may provide one to one coaching to a student in the cohort A. Further, the tutor C may be an experienced tutor with experience of teaching to the cohort B students. The system 102 may randomly assign a question asked by a student from the cohort C to the tutor C in real time. Further, the tutor C may answer the question. The answer received from the tutor C may be analysed based on a plurality of parameters comprising an accuracy of the answer, a type of the answer, a time taken by the tutor to answer, a number of questions assigned to a number of questions answered ratio, and a language used in the answer by the tutor. Further, a feedback about the tutor C may be requested from a student of the cohort C of students. The feedback may be based on the plurality of parameters related to the answers received from the tutor C. Furthermore, the tutor C may be evaluated based on the plurality of parameters and the feedback received using deep learning algorithms. The tutor C may be evaluated by comparing the feedback with an average feedback received by an expert tutor B, and comparing the time taken by the tutor C to answer with an average time taken by the expert tutor B to answer the question. It may be understood that the expert tutor B is assigned to the cohort A, the cohort B and the cohort C of students for teaching topics like Electronics and Physics. Finally, the tutor C may be promoted for a group coaching of the students based on the evaluation and the positive feedback received from the student belonging to the cohort C of students. The group coaching may comprise the students from the cohort B and the cohort C. Thus, the tutor C may be promoted to teach the cohort B as well as the cohort C students. Similarly, the tutor A may be promoted in future by the system 102 based on the analysis and evaluations.

Figure 4:
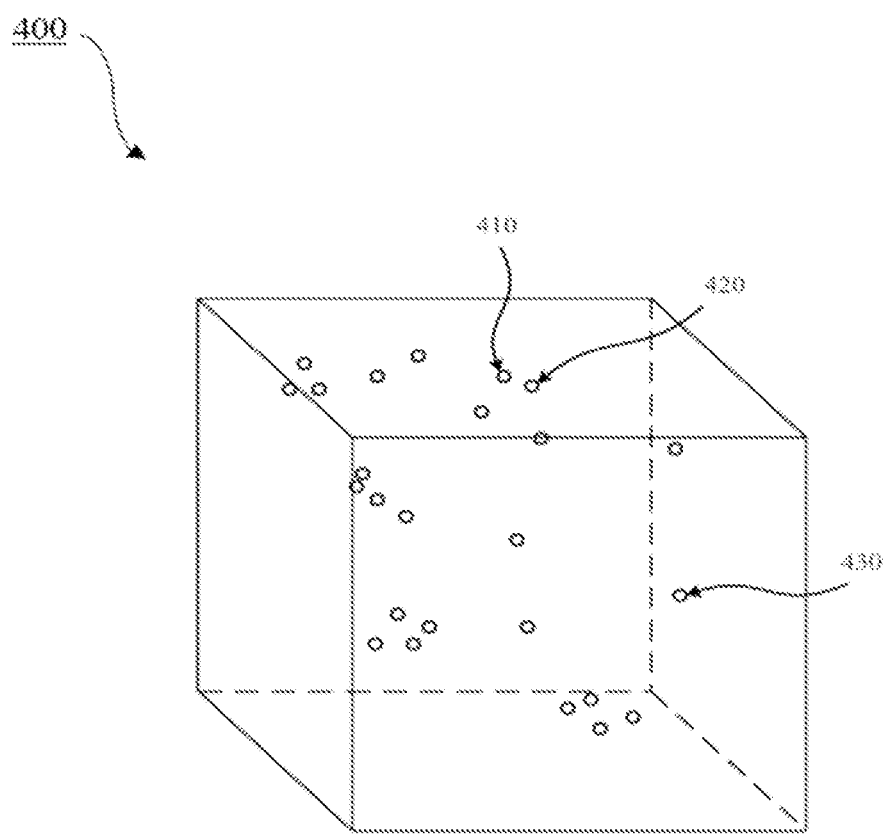
FIG. 4 illustrates an exemplary view of an embedding space in accordance with the present invention.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector).

As an example and not by way of limitation, vectors 410, 420, and 430 may be represented as points in the vector space 400, as illustrated in FIG. 4.

As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object. As an example and not by way of limitation, an answer to a question comprising a video or an image may be mapped to a vector by using an algorithm to evaluate the tutor based on the plurality of parameters on the platform. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information.

In particular embodiments, the system 102 may calculate a similarity metric of vectors in vector space 400. The similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
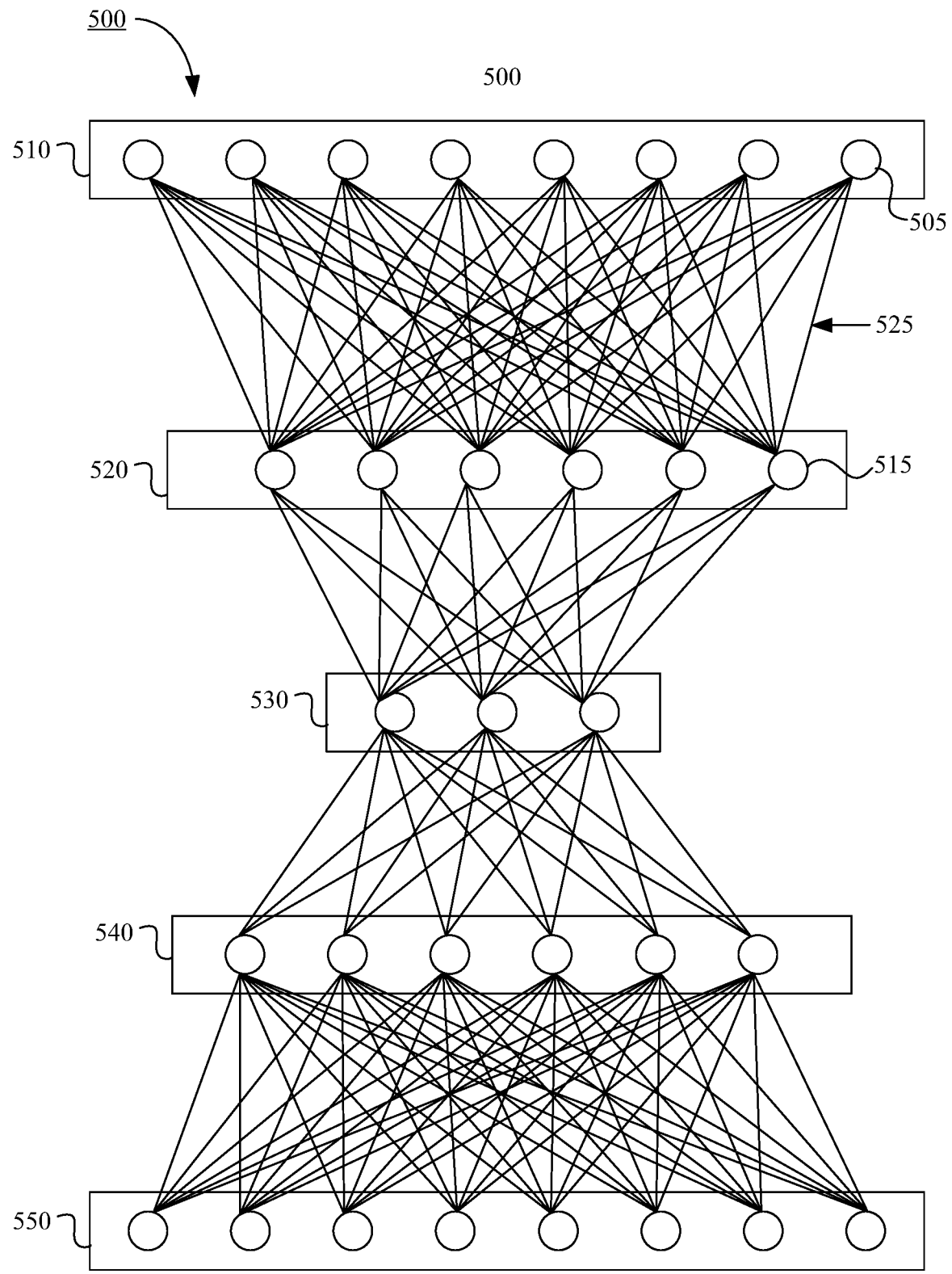
FIG. 5 illustrates an exemplary artificial neural network in accordance with the present invention.

Referring now to FIG. 5 illustrating an example artificial neural network ("ANN") 500 of the deep learning algorithms. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520.

In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, an ANN may be a deep neural network (e.g., a neural network comprising at least two hidden layers).

In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error).

In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method enable effective use of assessment for proper evaluation of the tutor on the platform.

Some embodiments of the system and the method promote high quality professional learning experience for the students.

Some embodiments of the system and the method helps to match the student's expectations from the tutor efficiently.

Some embodiments of the system and the method enable continuous learning of the model in order to promote a novice tutor to an expert tutor depending on the feedback of the students on the platform.

Although implementations for methods and system for promoting a tutor on a platform in real time have been described in language specific to structural features and/or methods, it is to be understood that the appended claims are not necessarily limited to the specific features or methods described. Rather, the specific features and methods are disclosed as examples of implementations for promoting a tutor on a platform in real time.

The invention claimed is:

1. A method for automated evaluation of a tutor on an educational platform in real time, the method comprises:
   receiving, by a processor, a tutor profile from a tutor on a user interface of an educational platform, wherein the tutor profile comprises a set of information about the tutor and a first cohort of students assigned to the tutor, and wherein the set of information comprises a demographic information, an academic detail, a subject of interest, a topic of interest, a language preference, a preferred mode of communication, an introductory video, and a time preference from the tutor;
   randomly assigning, by the processor, a question to the tutor on the user interface in real time, wherein the question is received from a student belonging to a second cohort of students, and wherein one or more expert tutors except the tutor are assigned to the second cohort of students, and wherein the expert tutor is assigned to multiple cohorts of students and is qualified for group coaching, and wherein the question is related to the subject of interest and the topic of interest of the tutor;
   receiving, by the processor, an answer to the question from the tutor on the user interface, wherein the answer is received in at least a textual form, an audio form, and an audio-visual form;
   analyzing, by the processor, the answer based on a machine learning model, wherein the answer is analyzed based on a plurality of parameters comprising an accuracy of the answer, a type of the answer, a time taken by the tutor to answer, a number of questions assigned to a number of questions answered ratio, and a language used in the answer by the tutor;
   continuously training, by the processor, the machine learning model to analyze the answer based on the question received from the student and the answer provided by the tutor on the educational platform, wherein the machine learning model is configured to identify the accuracy of the answers in real time, and wherein the machine learning model is trained with a training dataset comprising a plurality of questions relating to all subjects and a plurality of answers corresponding to each of the plurality of questions;
   requesting, by the processor, a feedback about the tutor from the student of the second cohort of students on the user interface, wherein the feedback is based on the plurality of parameters related to the answers received from the tutor;
   evaluating, by the processor, the tutor based on the plurality of parameters and the feedback received using deep learning algorithms, wherein the tutor is evaluated by:
      comparing the feedback with an average feedback received by one or more expert tutors; and
      comparing the time taken by the tutor to answer with an average time taken by the one or more expert tutors to answer the question, and wherein the one or more expert tutors are assigned to the second cohort of students;
   continuously training, by the processor, the deep learning algorithms to evaluate the tutor and generate a performance report of the tutor over a period of time, based on the feedback received from the student belonging to the second cohort of students, a response time of the tutor, and a result achieved by the students in the cohort allocated to the tutor;
   dynamically changing, by the processor, the category of the tutor as a novice tutor, an experienced tutor, and an expert tutor on basis of the analysis of the tutor in real time, wherein the analysis is based upon the performance report of the tutor; and
   automatically promoting, by the processor, the tutor on the educational platform for a group coaching of the students based on the evaluation and the feedback received from the student belonging to the second cohort of students, wherein the group coaching comprises the first cohort of students and the second cohort of students, and wherein the tutor continues to teach the first cohort of students along with the second cohort of students, thereby promoting the tutor.

2. The method as claimed in claim 1,
   wherein the performance report is generated using the deep learning algorithms, and wherein the performance report is based upon an efficiency of the tutor, a teaching approach, a response time of the tutor, a consistency of rating, availability, answering ability, the feedback, and results achieved by the students in the cohort allocated to the tutor.

3. The method as claimed in claim 2, further comprises: categorizing the tutor as the novice tutor, the experienced tutor, and the expert tutor based upon the feedback received from the first cohort of students and the second cohort of students.

4. The method as claimed in claim 1, wherein an audio recognition technique is used to convert the answer in the audio form to the textual form.

5. The method as claimed in claim 1 further, comprises demoting the tutor on the educational platform from the group coaching of the students to one-to-one coaching when the tutor receives a negative feedback for the group coaching.

6. The method as claimed in claim 1, wherein the set of information received from the tutor is in a structured data format.

7. A system for automated evaluation of a tutor on an educational platform in real time, the system compromising:
   a memory; and
   a processor coupled to the memory, wherein the processor is configured to execute program instructions stored in the memory for:
   receiving a tutor profile from a tutor on a user interface of an educational platform, wherein the tutor profile comprises a set of information about the tutor and a first cohort of students assigned to the tutor, and wherein the set of information comprises a demographic information, an academic detail, a subject of interest, a topic of interest, a language preference, a preferred mode of communication, an introductory video, and a time preference from the tutor;
   randomly assigning a question to the tutor in real time on the user interface, wherein the question is received from a student belonging to a second cohort of students, and wherein one or more expert tutors except the tutor are assigned to the second cohort of students, and wherein the expert tutor is assigned to multiple cohorts of students and is qualified for group coaching, and, wherein the question is related to the subject of interest and the topic of interest of the tutor;
   receiving an answer to the question from the tutor on the user interface, wherein the answer is received in at least a textual form, an audio form, and an audio-visual form;
   analyzing the answer based on a machine learning model, wherein the answer is analyzed based on a plurality of parameters comprising an accuracy of the answer, a type of the answer, a time taken by the tutor to answer, a number of questions assigned to a number of questions answered ratio, and a language used in the answer by the tutor;
   continuously training the machine learning model to analyze the answer based on the question received from the student and the answer provided by the tutor on the educational platform, wherein the machine learning model is configured to identify the accuracy of the answers in real time, and wherein the machine learning model is trained with a training dataset comprising a plurality of questions relating to all subjects and a plurality of answers corresponding to each of the plurality of questions;
   requesting a feedback about the tutor from the student of the second cohort of students on the user interface, wherein the feedback is based on the plurality of parameters related to the answers received from the tutor;
   evaluating the tutor based on the plurality of parameters and the feedback received using deep learning algorithms, wherein the tutor is evaluated by:
      comparing the feedback with an average feedback received by one or more expert tutors; and
      comparing the time taken by the tutor to answer with an average time taken by the one or more expert tutors to answer the question, and wherein the one or more expert tutors are assigned to the second cohort of students;
   continuously training the deep learning algorithms to evaluate the tutor and generate a performance report of the tutor over a period of time, based on the feedback received from the student belonging to the second cohort of students, a response time of the tutor, and a result achieved by the students in the cohort allocated to the tutor;
   dynamically changing the category of the tutor as a novice tutor, an experienced tutor, and an expert tutor on basis of the analysis of the tutor in real time, wherein the analysis is based upon the performance report of the tutor; and
   automatically promoting the tutor on the educational platform for a group coaching of the students based on the evaluation and the feedback received from the student belonging to the second cohort of students, wherein the group coaching comprises the first cohort of students and the second cohort of students, and wherein the tutor continues to teach the first cohort of students along with the second cohort of students, thereby promoting the tutor.

8. The system as claimed in claim 7, wherein the performance report is generated using the deep learning algorithms, and wherein the performance report is based upon an efficiency of the tutor, a teaching approach, a response time of the tutor, a consistency of rating, availability, answering ability, and results achieved by the students in the cohort allocated to the tutor.

9. The system as claimed in claim 8, further comprising: categorizing the tutor as the novice tutor, the experienced tutor, and the expert tutor based upon the feedback received from the first cohort of students and the second cohort of students.

10. The system as claimed in claim 7, wherein an audio recognition technique is used to convert the answer in the audio form to the textual form.

11. The system as claimed in claim 7, wherein one or more cohort of the students are automatically assigned to the tutor based on deep learning algorithms.

12. A non-transitory computer program product having embodied thereon a computer program for automated evaluation of a tutor on an educational platform in real time, the computer program product storing instructions, the instructions comprising instructions for:
   receiving a tutor profile from a tutor on a user interface of an educational platform, wherein the tutor profile comprises a set of information about the tutor and a first cohort of students assigned to the tutor, and wherein the set of information comprises a demographic information, an academic detail, a subject of interest, a topic of interest, a language preference, a preferred mode of communication, an introductory video, and a time preference from the tutor;

randomly assigning a question to the tutor on the user interface in real time, wherein the question is received from a student belonging to a second cohort of students, and wherein one or more expert tutors except the tutor are assigned to the second cohort of students, and wherein the expert tutor is assigned to multiple cohorts of students and is qualified for group coaching, and wherein the question is related to the subject of interest and the topic of interest of the tutor;

receiving an answer to the question on the user interface from the tutor, wherein the answer is received in at least a textual form, an audio form, and an audio-visual form;

analyzing the answer based on a machine learning model, wherein the answer is analyzed based on a plurality of parameters comprising an accuracy of the answer, a type of the answer, a time taken by the tutor to answer, a number of questions assigned to a number of questions answered ratio, and a language used in the answer by the tutor;

continuously training the machine learning model to analyze the answer based on the question received from the student and the answer provided by the tutor on the educational platform, wherein the machine learning model is configured to identify the accuracy of the answers in real time, and wherein the machine learning model is trained with a training dataset comprising a plurality of questions relating to all subjects and a plurality of answers corresponding to each of the plurality of questions;

requesting a feedback about the tutor from the student of the second cohort of students on the user interface, wherein the feedback is based on the plurality of parameters related to the answers received from the tutor;

evaluating the tutor based on the plurality of parameters and the feedback received using deep learning algorithms, wherein the tutor is evaluated by:

comparing the feedback with an average feedback received by one or more expert tutors; and comparing the time taken by the tutor to answer with an average time taken by the one or more expert tutors to answer the question, and wherein the one or more expert tutors are assigned to the second cohort of students;

continuously training the deep learning algorithms to evaluate the tutor and generate a performance report of the tutor over a period of time, based on the feedback received from the student belonging to the second cohort of students, a response time of the tutor, and a result achieved by the students in the cohort allocated to the tutor;

dynamically changing the category of the tutor as a novice tutor, an experienced tutor. and an expert tutor on basis of the analysis of the tutor in real time, wherein the analysis is based upon the performance report of the tutor; and automatically promoting the tutor on the educational platform for a group coaching of the students based on the evaluation and the feedback received from the student belonging to the second cohort of students, wherein the group coaching comprises the first cohort of students and the second cohort of students, and wherein the tutor continues to teach the first cohort of students along with the second cohort of students, thereby promoting the tutor.

13. The method as claimed in claim 1, further comprises automatically changing a cohort of the tutor, wherein the cohort comprises a plurality of student enrolled on the educational platform, and wherein the change is dependent on the feedback, and a performance of the students in the cohort.

14. The system as claimed in claim 7, further comprises automatically changing a cohort of the tutor, wherein the cohort comprises a plurality of student enrolled on the educational platform, and wherein the change is dependent on the feedback, and a performance of the students in the cohort.

15. The method as claimed in claim 1, wherein the answer to the question is mapped to a vector to evaluate the tutor based on the plurality of parameters on the educational platform.

16. The system as claimed in claim 7, wherein the answer to the question is mapped to a vector to evaluate the tutor based on the plurality of parameters on the educational platform.

* * * * *